V. G. PAULTER.
AUTOMOBILE RADIATOR SHIELD.
APPLICATION FILED APR. 5, 1921.
1,431,483.
Patented Oct. 10, 1922.
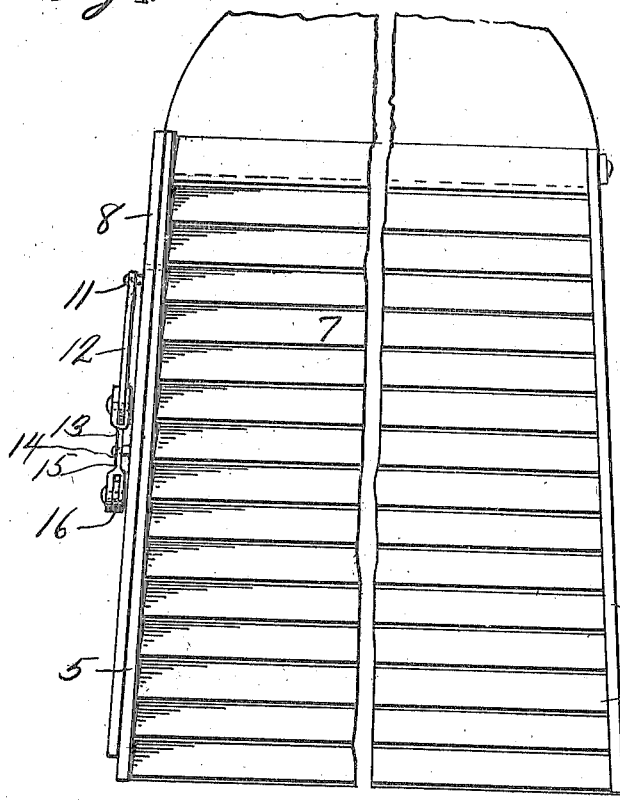
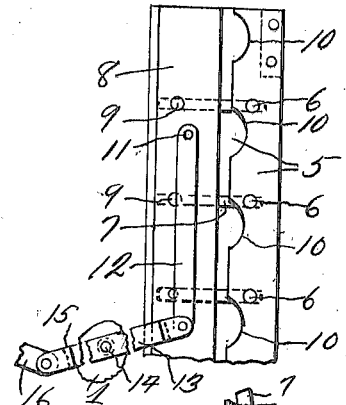
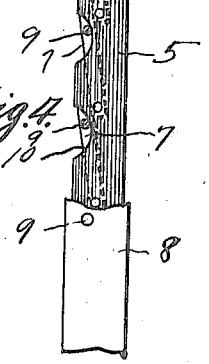
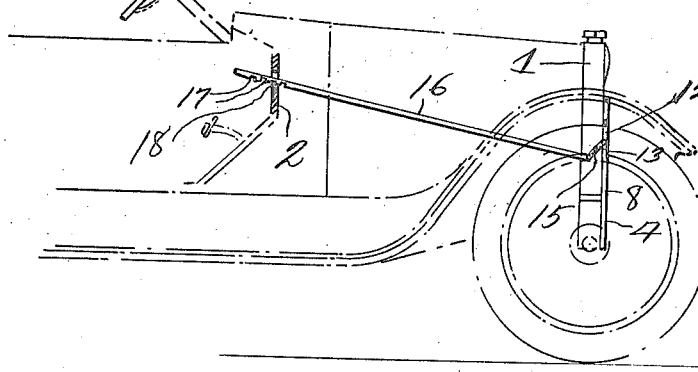
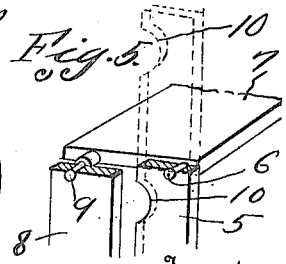
Inventor
V. G. Paulter
By D. Swift
Attorney Patented Oct. 10, 1922.

1,431,483

UNITED STATES PATENT OFFICE.

VICTOR G. PAULTER, OF FORT GAGE, ILLINOIS.

AUTOMOBILE RADIATOR SHIELD.

Application filed April 5, 1921. Serial No. 458,700.

*To all whom it may concern:*

Be it known that I, VICTOR G. PAULTER, a citizen of the United States, residing at Fort Gage, in the county of Randolph, State of Illinois, have invented new and useful Automobile Radiator Shields; and I do hereby declare the following to be a full, clear, and exact description of the invention, such as will enable others skilled in the art to which it appertains to make and use the same.

The invention relates to shields for automobile radiators and has for its object to provide a device of this character comprising a plurality of pivoted shutters controllable by the operator from a point adjacent the steering wheel of the vehicle by means of which shutters the amount of air allowed to pass through the radiator may be varied according to weather conditions.

A further object is to provide a radiator shield comprising substantially vertically disposed side rails adapted to be secured in any suitable manner to the radiator, said side rails having pivotally mounted therebetween and in overlapped relation, a plurality of shutters. Also to provide means for simultaneously adjusting said shutters at corresponding angles, said means comprising a bar vertically disposed and located outside of one of the side rails in which bar lugs carried by the free ends of the shutters are pivoted, said lugs when the shutters are closed being received in notches in the rear edge of one of the side rails, and to provide means for moving the vertically disposed bar longitudinally for adjusting the plurality of shutters.

With the above and other objects in view the invention resides in the combination and arrangement of parts as hereinafter set forth, shown in the drawings, described and claimed it being understood that changes in the precise embodiment of the invention may be made within the scope of what is claimed without departing from the spirit of the invention.

In the drawings:—

Figure 1 is a front elevation of the radiator shield.

Figure 2 is a side elevation of a conventional form of automobile, showing the shield applied thereto.

Figure 3 is an enlarged detail, showing a portion of the shield in side elevation.

Figure 4 is an enlarged detail view in side elevation of a portion of the radiator shield, showing the shutters closed.

Figure 5 is a detail perspective view of a portion of one of the shutters showing the manner of pivoting the same to one of the side rails and to the operating bar.

Referring to the drawings, the numeral 1 designates a radiator of a conventional form of automobile and 2 the instrument board of the automobile located adjacent the steering wheel 3. It has been found that if the volume of air allowed to pass through the radiator is controlled especially in cold weather that freezing of the cooling fluid which passes through the radiator may be obviated. To accomplish this result a radiator cover 4 is provided. The cover 4 comprises substantially vertically disposed side rails 5, which may be secured in any suitable manner to the radiator and pivotally connected to said side rails as at 6 is a plurality of pivoted shutters 7, which shutters are adapted to be simultaneously moved upwardly at their free ends by the vertical movement of an operating bar 8, to which operating bar said shutters are pivotally connected by lugs 9. It will be seen that when the operating bar 8 is forced upwardly that all of the shutters will simultaneously move towards the closed position as shown in Figure 4, thereby allowing the amount of air that passes through the shutters to the radiator to be regulated, and if so desired in cold weather the air may be shut off entirely from the radiator, for preventing freezing of the cooling fluid within the radiator. One of the side rails 6 is provided with spaced notches 10, which notches when the shutters are in closed position as shown in Figure 4 receive the lugs 9 thereby allowing the shutters to be entirely closed, and also providing a compact and rigid structure.

Pivotally connected to the operating bar 9 at 11 is a link 12, the lower end of which link is pivotally connected to a lever 13 carried by the radiator 1. The lever 13 is centrally pivoted as at 14 and has pivotally connected to its arm 15 a rearwardly extending operating bar 16. It will be seen that by a rearward pull on the operating bar 16 bar 8 will be pulled downwardly, thereby opening the plurality of shutters 7 to the position shown in Figure 3, and by a forward movement of the bar 16, the operating bar 8 will be moved upwardly, thereby moving the plurality of shutters 7 to a closed position as shown in Figure 4. However, it is obvious that on account of the weight of the shutters 7 and the operating bar 8 means will have to be provided for holding the bar 16 in various positions. This may be accomplished in any suitable manner, however, for purposes of illustration the bar 16 is provided with a plurality of notches 17, which notches engage over the edge of a plate 18 carried by the instrument board 2 and when so engaged prevent movement of the bar 16 in either direction.

From the above it will be seen that a radiator shield is provided which is simple in construction, and the amount of air passing through the shield to the radiator may be easily and quickly controlled by the operator from a point adjacent the steering wheel.

The invention having been set forth what is claimed as new and useful is:—

The combination with an automobile radiator, of a cover for said radiator, said cover comprising a frame a plurality of horizontally disposed shutters pivoted adjacent one of their edges in the sides of the frame, lugs carried by the ends of the shutters adjacent their free edges, said lugs being connected together by a vertically disposed and movable operating bar, said operating bar being pivoted on the lugs at points spaced from the ends of the shutters and outside of the side members of the frame, the side frame member adjacent the operating bar having spaced notches therein, thereby allowing the operating bar to move into registration with the side of the frame and the lugs to pass into said notches and lever means for moving the vertically disposed operating bar and holding said operating bar in any position to which it may have been moved.

In testimony whereof I have signed my name to this specification in the presence of two subscribing witnesses.

VICTOR G. PAULTER.

Witnesses:
FRANK B. PAULTER,
W. A. BARBEAU.